(12) United States Patent
Wang

(10) Patent No.: US 12,157,689 B2
(45) Date of Patent: Dec. 3, 2024

(54) METHOD FOR TREATING WASTEWATER OR SLUDGE

(71) Applicant: THE UNIVERSITY OF QUEENSLAND, St Lucia (AU)

(72) Inventor: Zhiyao Wang, St Lucia (AU)

(73) Assignee: THE UNIVERSITY OF QUEENSLAND, St Lucia (AU)

( * ) Notice: Subject to any disclaimer, the term of this patent is extended or adjusted under 35 U.S.C. 154(b) by 462 days.

(21) Appl. No.: 17/600,431

(22) PCT Filed: Mar. 27, 2020

(86) PCT No.: PCT/AU2020/050293
§ 371 (c)(1),
(2) Date: Sep. 30, 2021

(87) PCT Pub. No.: WO2020/237283
PCT Pub. Date: Dec. 3, 2020

(65) Prior Publication Data
US 2022/0194834 A1    Jun. 23, 2022

(30) Foreign Application Priority Data

May 24, 2019  (AU) ................................. 2019901771

(51) Int. Cl.
*C02F 3/30* (2023.01)
*C02F 1/62* (2023.01)
(Continued)

(52) U.S. Cl.
CPC ................ *C02F 3/307* (2013.01); *C02F 1/62* (2013.01); *C02F 3/006* (2013.01); *C02F 3/12* (2013.01);
(Continued)

(58) Field of Classification Search
CPC .. C02F 3/307; C02F 1/62; C02F 3/006; C02F 3/12; C02F 3/1263; C02F 3/1268;
(Continued)

(56) References Cited

U.S. PATENT DOCUMENTS 4,595,508 A * 6/1986 Wolfe ..................... B01J 39/07
210/669
2014/0360933 A1   12/2014 Rezania et al.

FOREIGN PATENT DOCUMENTS

CN        101284697 A     10/2008
CN        103796962 A      5/2014
(Continued)

OTHER PUBLICATIONS

Hayatsu et al., An acid-tolerant ammonia-oxidizing γ-proteobacterium from soil, International Society for Microbial Ecology Journal (2017), 11 , p. 1130-1141.*
(Continued)

*Primary Examiner* — Fred Prince
(74) *Attorney, Agent, or Firm* — Nixon & Vanderhye P.C.

(57) ABSTRACT

A method for treating wastewater or sludge comprises the steps of adding the wastewater or sludge to a reactor and mixing the wastewater or sludge with a stream to thereby decrease a ratio of alkalinity to ammonium in the reactor, the reactor containing ammonium oxidising bacteria that oxidise ammonium to produce nitrite and decrease pH.

16 Claims, 5 Drawing Sheets

(51) Int. Cl.
| | |
|---|---|
| *C02F 1/66* | (2023.01) |
| *C02F 3/00* | (2023.01) |
| *C02F 3/12* | (2023.01) |
| *C02F 3/34* | (2023.01) |
| *C02F 11/02* | (2006.01) |
| *C02F 11/04* | (2006.01) |
| *C02F 11/12* | (2019.01) |
| *C02F 11/18* | (2006.01) |
| *C02F 101/16* | (2006.01) |
| *C02F 101/20* | (2006.01) |
| *C02F 103/00* | (2006.01) |

(52) U.S. Cl.
CPC .......... *C02F 3/1263* (2013.01); *C02F 3/1268* (2013.01); *C02F 3/302* (2013.01); *C02F 3/341* (2013.01); *C02F 11/04* (2013.01); *C02F 11/12* (2013.01); *C02F 11/18* (2013.01); *C02F 1/66* (2013.01); *C02F 11/02* (2013.01); *C02F 2101/16* (2013.01); *C02F 2101/166* (2013.01); *C02F 2101/20* (2013.01); *C02F 2103/002* (2013.01); *C02F 2103/005* (2013.01); *C02F 2209/06* (2013.01); *C02F 2209/07* (2013.01); *C02F 2209/44* (2013.01); *Y02W 10/20* (2015.05)

(58) Field of Classification Search
CPC .......... C02F 3/302; C02F 3/341; C02F 11/04; C02F 11/12; C02F 11/18; C02F 1/66; C02F 11/02; C02F 2101/16; C02F 2101/166; C02F 2101/20; C02F 2103/002; C02F 2103/005; C02F 2209/06; C02F 2209/07; C02F 2209/44; Y02W 10/20
USPC .......... 210/605, 614, 620, 623, 903
See application file for complete search history.

(56) References Cited

FOREIGN PATENT DOCUMENTS

| CN | 105859040 A | 8/2016 |
|---|---|---|
| CN | 106986447 A | 7/2017 |
| JP | 2008-272610 | 11/2008 |
| JP | 2010-201394 | 9/2010 |
| WO | 2011/134011 | 11/2011 |
| WO | 2013/000010 A1 | 1/2013 |
| WO | 2018/176096 A1 | 10/2018 |

OTHER PUBLICATIONS

International Search Report for PCT/AU2020/050293, mailed Jul. 13, 2020, 6 pages.
Written Opinion of the ISA for PCT/AU2020/050293, mailed Jul. 13, 2020, 8 pages.
Fumasoli et al., "Growth ofNitrosococcus-Related Ammonia Oxidizing Bacteria Coincides with Extremely Low pH Values in Wastewater with High Ammonia Content", Environmental Science & Technology, 2017, vol. 51, No. 12, pp. 6857-6866.
Supplementary Partial European Search Report dated Apr. 6, 2023, issued in European Application No. 20813737.2, 18 pages.
Duan, Haoran, et al., "Overcoming Nitrite Oxidizing Bacteria Adaptation through Alternating Sludge Treatment with Free Nitrous Acid and Free Ammonia", Environmental Science & Technology, vol. 53, 2019, pp. 1937-1946.
Hayatsu, Masahito, et al., "An acid-tolerant ammonia-oxidizing γ-proteobacterium from soil", The ISME Journal, vol. 11, 2017, pp. 1130-1141.
Tarre, Sheldon, et al., "High-Rate Nitrification at Low pH in Suspended- and Attached-Biomass Reactors", Applied and Environmental Microbiology, vol. 70, No. 11, Nov. 2004, pp. 6481-6487.
Extended European Search Report dated Jul. 11, 2023, issued in European Application No. 20813737.2, 20 pages.
Figueroa-Torres, Gonzalo M., et al., "Effect of Copper and Iron on Acidogenic Biomass in an Anaerobic Packed Bed Reactor", Advances in Bioscience and Biotechnology, vol. 5, No. 6, Jan. 1, 2014, pp. 564-571.
Yang, Jing-Rui, et al., "Ammonium removal characteristics of an acid-resistant bacterium *Acinetobacter* sp. JR1 from pharmaceutical wastewater capable of heterotrophic nitrification-aerobic denitrification", Bioresource Technology, vol. 274, Feb. 1, 2019, pp. 56-64.
Office Action dated Nov. 22, 2023, issued in China Patent Application No. 202080030985.6, 9 pages.

* cited by examiner

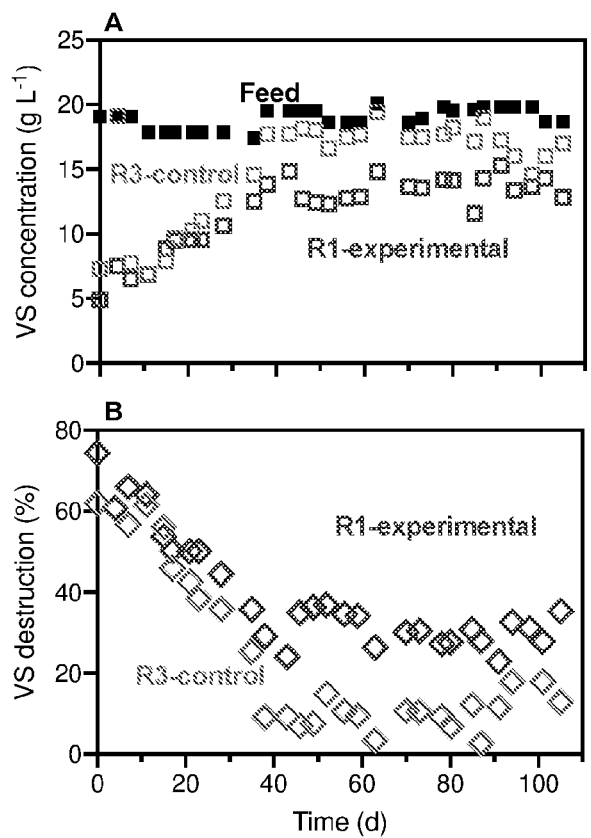
FIGURES 6A (top) and 6B
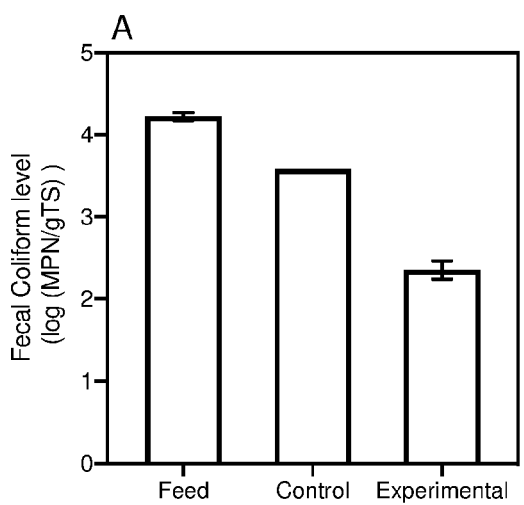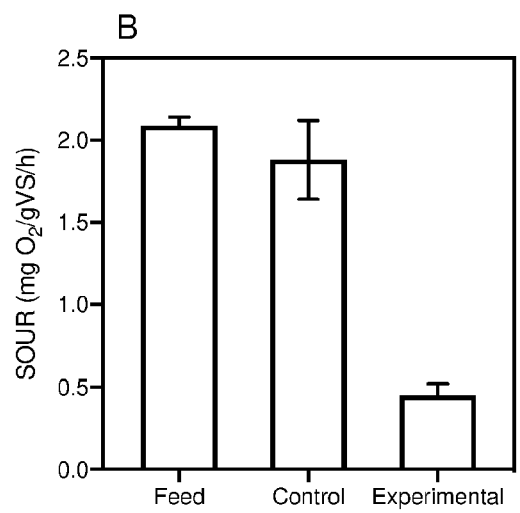
FIGURE 7A
FIGURE 7B

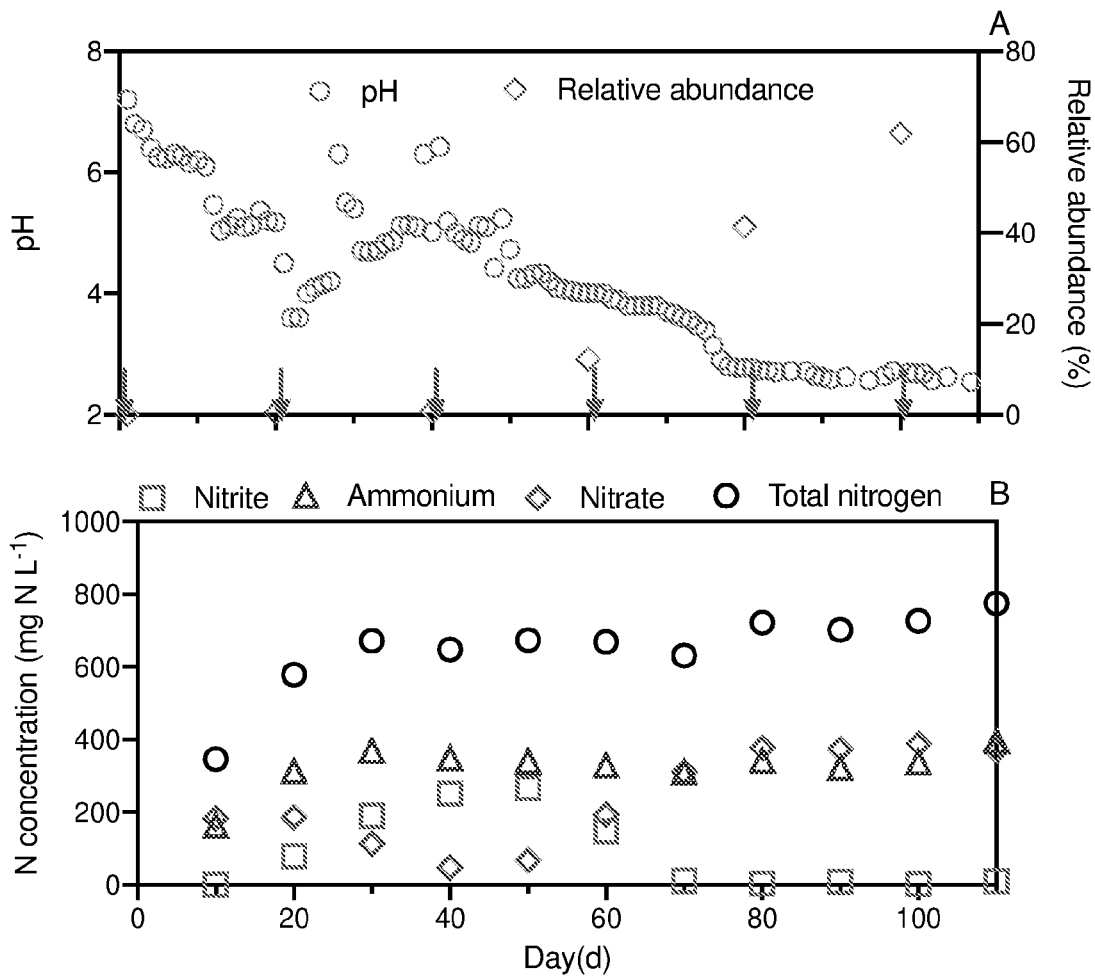
FIGURES 8A (top) and 8B
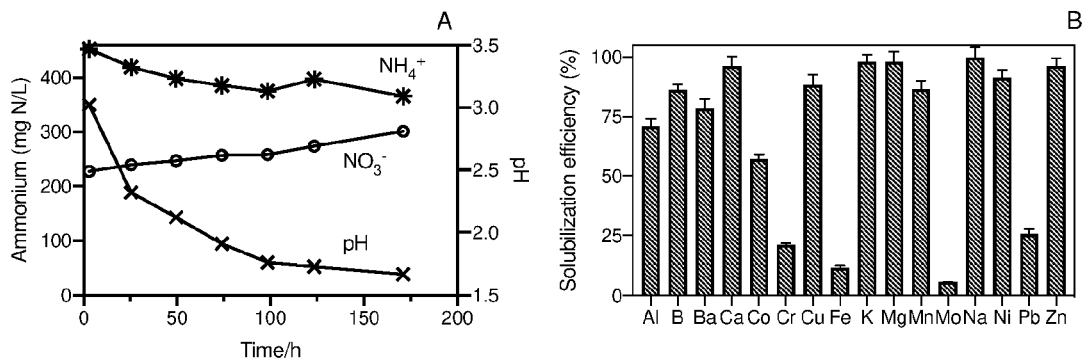
FIGURE 9A                    FIGURE 9B

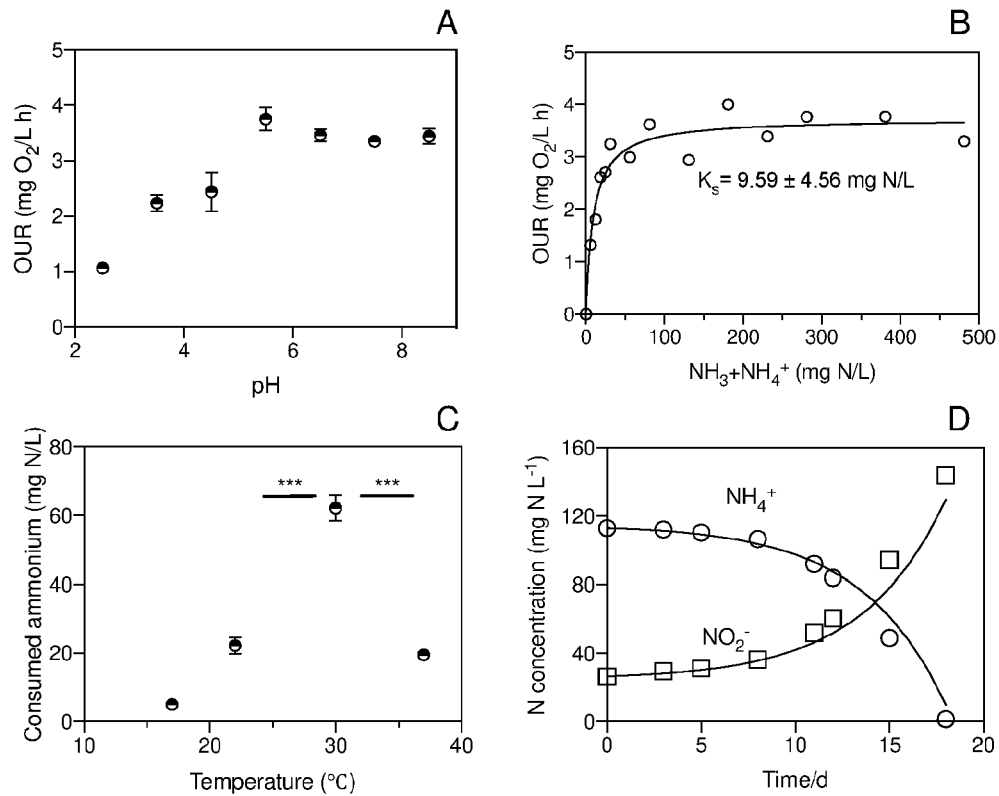
FIGURE 10A (top left)  FIGURE 10B (top right),
FIGURE 10C (bottom left)  FIGURE 10D (bottom right)
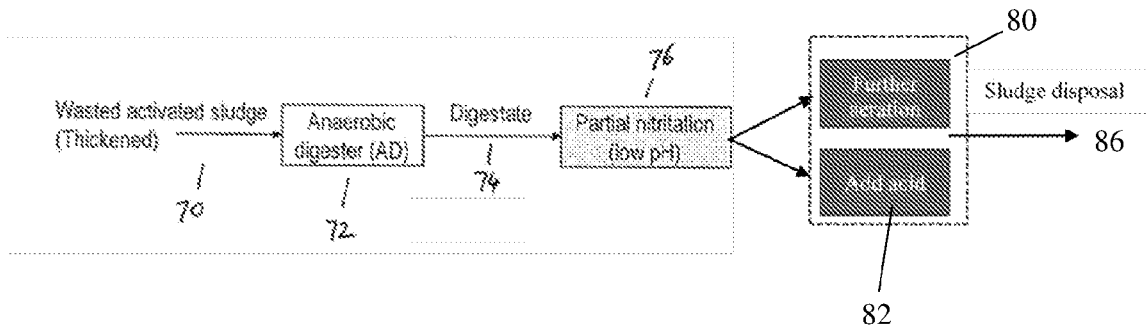
FIGURE 11

METHOD FOR TREATING WASTEWATER OR SLUDGE

This application is the U.S. national phase of International Application No. PCT/AU2020/050293 filed 27 Mar. 2020, which designated the U.S. and claims priority to AU Patent Application No. 2019901771 filed 24 May 2019, the entire contents of each of which are hereby incorporated by reference.

TECHNICAL FIELD

The present invention relates to a method for treating wastewater or sludge. More particularly, the present invention relates to a method that results in mainstream deammonification through altering the wastewater ammonium to alkalinity ratio. In other aspects, the present invention relates to a method for sludge reduction or a method for removing metals from sewage or sludge.

BACKGROUND ART

Microbial processes play a central role in wastewater management. In particular, they underpin biological treatment of wastewater, the most cost-effective and environmentally friendly method for wastewater treatment.

A typical advanced wastewater treatment plant receives wastewater from sewage mains. The wastewater is first treated to remove large particulates (by screening, or passing through a primary settler, or both). The liquor then passes to bioreactors, where bacteria mineralise organic carbon (often referred to as biological oxygen demand or BOD) to $CO_2$ and convert ammonia to nitrate, and in some cases further to nitrogen gas. Some bioreactors also achieve biological phosphorus removal. This process results in the growth of biomass. The biomass is then separated from the liquor, typically in a secondary settler.

The sludge from the secondary settler (which includes most of the separated biomass) is then treated in an anaerobic digester or an aerobic digester, sometimes together with primary sludge resulting from the settling process in the primary settler. In the anaerobic digester, part of the BOD of the sludge is converted to methane. Products from the anaerobic digester also include solids that may be disposed of and a liquid stream. In the aerobic digester, part of the organics in the sludge is mineralised thus achieving the stabilisation and a reduction of the sludge to be disposed of.

Variations around this general process described above also exist.

Bioreactors used for treating primary effluent can consist of aerobic, anoxic and even anaerobic zones/conditions. Throughout this specification, the term "bioreactor for treating wastewater" is used to refer to any reactor in which microorganisms utilise or catalyse conversion of wastewater stream components into other components. The bioreactor may be an aerobic bioreactor, an anaerobic bioreactor or an anoxic bioreactor, or it may be operated under two or more such conditions (typically in sequence, but different zones of a bioreactor may operate under different conditions, for example, a top part of a bioreactor may be operating under aerobic conditions and a bottom part of the bioreactor may be operating under anaerobic conditions.

In a typical wastewater treatment plant, both biological nutrient removal and energy recovery require organic carbon. The requirement for high-level nutrient removal from wastewaters has often seen the abolishment of the primary settler, to satisfy the carbon demand for nutrient removal in the downstream processes of the wastewater treatment plant. However, abolishing the primary settler eliminates an energy rich stream for anaerobic digestion. This reduces the energy yield of the plant and renders energy recovery through anaerobic digestion economically infeasible for small to medium-sized wastewater treatment plants.

One reason for the high demand of organic carbon feed for nutrient removal is biomass production. In this regard, in the bioreactor for treating wastewater, the reactions that are taking place are typically biologically driven. As a result, the microorganisms that catalyse these reactions grow and a substantial biomass is produced. These microorganisms assimilate a large amount organic carbon as biomass. Typically, 30 to 40% of the organic carbon fed to the bioreactor is assimilated by bacterial cells in the form of active bacterial cells and debris resulting from cell death and lysis, and is subsequently removed from the bioreactor as excess secondary sludge.

The secondary sludge is often supplied to an anaerobic digester in order to convert part of the BOD of the sludge to biogas containing methane. However, this large stream of secondary sludge, although containing large amounts of organic carbon, is poorly biodegradable. Pre-treatment of the sludge is required to break up bacterial cell walls to make its carbon more available for the reactions in the anaerobic digester, such as methane production, or in another bioreactor for treating wastewater as an external carbon source for denitrification.

Various methods have been developed to improve the bioavailability of this sludge stream. However, these methods are either energy intensive (such as thermal treatment, sonication, or ozonation) or consume large amounts of imported chemicals, such as acid, alkali or hydrogen peroxide. This incurs significant economic and environmental costs.

The anammox process is gathering increased attention in wastewater treatment processes. The conventional anammox process removes ammonium from wastewater and the overall process includes two separate processes. The first step in the process is the partial nitritation of approximately half of the ammonia to nitrite by ammonium oxidising bacteria (AOB), in accordance with the following equation:

$$NH_4^+ + 1.5O_2 \rightarrow NO_2^- + 2H^+ + H_2O \qquad (1)$$

The resulting ammonium and nitrite are converted in the anammox process to nitrogen gas by bacteria that mediate the following reaction:

$$NH_4^+ + NO_2^- \rightarrow N_2 + 2H_2O \qquad (2)$$

Some nitrate (not shown in reaction (2) above for simplicity) is also formed by the anammox bacteria.

Anammox processes are generating increased attention. However, the Anammox process requires the elimination or suppression of nitrite oxidising bacteria (NOB) whilst retaining ammonium oxidising bacteria (AOB) in the system. This remains a bottleneck in the mainstream implementation of the Anammox process.

Thermal hydrolysis pre-treatment (THP) is commonly used to enhance bioenergy recovery in an anaerobic digestion (AD). This process is typically used to treat the sludge. It commonly involves high-pressure boiling of wastewater sludge, followed by a rapid depressurization. This combined action sterilises the sludge and makes it more biodegradable, which improves digestion performance. Variations in the THP process also exist. THP significantly improves the dewaterability of the sludge.

Following THP, the treated sludge can be sent to anaerobic digestion. The THP enhances bioenergy recovery in the anaerobic digestion. However, the liquor obtained from anaerobic digestion following THP (designated as THP-AD liquor) can be difficult to handle, due to the much higher ammonium concentration in anaerobic digestion liquor after THP compared with conventional anaerobic digestion liquor, as well as the presence of other unknown inhibitory compounds.

In our international patent application number PCT/AU2018/050292, the entire contents of which are here incorporated by cross-reference, a method for treating a sludge derived from sewage or wastewater is described, the method comprising subjecting the sludge to a treatment step at a pH of 8.9 or greater and a free ammonia (FA) content of 100 mg $NH_3$—N/L or greater. In one embodiment, the method of this international patent application comprises the steps of treating wastewater or wastewater sludge in a bioreactor, passing part or all of a secondary sludge generated in the bioreactor to an anaerobic digester, treating another part of the secondary sludge produced in the bioreactor at a pH of 8.9 or greater and a free ammonia (FA) content of 100 mg $NH_3$—N/L or greater, and forwarding treated sludge to the bioreactor. An anaerobic digestion liquor is removed from the anaerobic digester and part of the anaerobic digestion liquor is passed to the free ammonia treatment step. Some of the anaerobic digestion liquor may also be returned to the bioreactor. These embodiments are effective to select AOB over NOB in the bioreactor, thereby resulting in denitrification occurring via the nitrite pathway, also called the nitrite shunt, rather than via the nitrate pathway.

In our international patent application number PCT/AU2012/000725, the entire contents of which are incorporated herein by cross-reference, a method for the pretreatment of sludge to be fed to a bioreactor for treating wastewater or an anaerobic or an aerobic sludge digester by contacting the sludge with free nitrous acid. The free nitrous acid may be generated by forming nitrite ($NO_2^-$) in the sludge or liquor and acidifying the sludge or liquor to a pH below 6.5, or to a pH below 6. The process described in this international patent application results in significant killing of the bacteria, which causes cell lysis and thereby renders the contents of the cells available as an organic carbon source.

In one embodiment described in our international patent application number PCT/AU2012/000725, the treatment of the sludge can be controlled such that nitrogen removal with the sludge can occur via the nitrite pathway, that is, through ammonium oxidation to nitrite and then nitrite reduction to dinitrogen gas. This pathway can be schematically described as $NH_4^+ \rightarrow NO_2^- \rightarrow N_2$. In particular, the operating premise of this embodiment can be controlled such that nitrite oxidising bacteria are largely eliminated from the system whilst ammonium oxidising bacteria remained in the system. In some embodiments, the concentration of free nitrous acid, the duration of treatment with free nitrous acid and the solids retention time can be controlled such that nitrite oxidising bacteria are largely eliminated from the system whilst ammonium oxidising bacteria remained in the system.

This embodiment of the process described in PCT/AU2012/000725 is based upon the discovery that treatment with free nitrous acid (FNA) results in the reduction of ammonium oxidising bacteria (AOB), nitrite oxidising bacteria (NOB) and other heterotrophic organisms (OHO). However, treatment with FNA results in a significantly greater reduction in NOB and OHO, when compared to the reduction that occurs in AOB. During full nitrification, AOB oxidise ammonia to nitrite, NOB then oxidise nitrite ($NO_2^-$) to nitrate ($NO_3^-$). The oxidation of nitrite to nitrate consumes 25% of the oxygen required for ammonium oxidation to nitrate. In the subsequent denitrification, nitrate is reduced to nitrite, and nitrite is further reduced to dinitrogen gas via nitric oxide and nitrous oxide. This process requires organic carbon as the electron donor. The amount of carbon required for nitrate reduction to nitrite represents 40% of that requires for full conversion of nitrate to dinitrogen gas. By reducing AOB to a certain extent and reducing NOB and OHO to a greater extent by treatment with FNA, the amount of nitrite oxidized to nitrate is reduced, thereby reducing the amount of oxygen required for the oxidation of ammonium, and the amount of carbon required to support the reduction steps. The savings in oxygen and carbon consumption can be up to 25% and 40%, respectively.

It will be clearly understood that, if a prior art publication is referred to herein, this reference does not constitute an admission that the publication forms part of the common general knowledge in the art in Australia or in any other country.

SUMMARY OF INVENTION

The present invention is directed to a method for treating wastewater or sludge, which may at least partially overcome at least one of the abovementioned disadvantages or provide the consumer with a useful or commercial choice.

With the foregoing in view, the present invention in one form, resides broadly in a method for treating wastewater or sludge comprising the steps of adding the wastewater or sludge to a reactor and mixing the wastewater or sludge with a stream to thereby decrease a ratio of alkalinity to ammonium in the reactor, the reactor containing ammonium oxidising bacteria that oxidise ammonium to produce nitrite and decrease pH.

The stream that is added to the reactor to decrease the ratio of alkalinity to ammonium in the reactor may comprise any stream that can achieve this effect. In one embodiment, the stream added to the reactor is a stream containing ammonium. As the stream contains ammonium ions, the ratio of alkalinity to ammonium decreases as the amount of ammonium increases. The stream may comprise a liquor or it may comprise a suspension or it may comprise a sludge.

The stream that decreases a ratio of alkalinity to ammonium in the reactor may be added directly to the reactor, such as being a separate stream added to the reactor, or it may be mixed with the wastewater or sludge prior to entry to the reactor with the combined stream being added to the reactor.

Throughout this specification, the term "to decrease a ratio of alkalinity to ammonium in the reactor" is used to mean that the ratio of alkalinity to ammonium in the reactor is lower than the ratio of alkalinity to ammonium in the wastewater feed or sludge feed that is provided to the reactor and to denote that the ratio of alkalinity to ammonium in the reactor is lower as a result of the stream being fed to the reactor than it would be if the stream was not fed to the reactor.

In one embodiment, the stream that is added to the reactor comprises liquor from an anaerobic digester. In another embodiment, the stream that is added to the reactor comprises liquor from an anaerobic digester that receives sludge from a thermal hydrolysis pre-treatment. In another embodiment the stream that is added to the reactor comprises a suspension from an anaerobic digester. In another embodiment, the stream that is added to the reactor comprises a suspension from an anaerobic digester that receives sludge from a thermal hydrolysis pre-treatment. In another embodiment the stream that is added to the reactor comprises a sludge from an anaerobic digester. In another embodiment, the stream that is added to the reactor comprises a sludge from an anaerobic digester that receives sludge from a thermal hydrolysis pre-treatment.

In one embodiment, the reactor is operated such that the pH of solution or liquor in the reactor is less than 5.5, or less than 5.0, or from 4 to 5, or from 4.5 to 5.

In one embodiment, at least some of the contents of the reactor are transferred to an anammox reactor.

In one embodiment, the method comprises providing a sludge or wastewater, splitting the sludge or wastewater into a first stream and a second stream, providing the first stream to the reactor and mixing the first stream in the reactor with the stream to thereby decrease the ratio of alkalinity in to ammonium in the reactor, wherein ammonium oxidising bacteria oxidise ammonium to produce nitrite and lower pH, removing a treated stream from the reactor and feeding the treated stream and the second stream to an anammox reactor.

In one embodiment, approximately half of the sludge or wastewater goes into the first stream and approximately half of the sludge or wastewater goes into the second stream.

In one embodiment, the ratio of alkalinity to ammonium in the reactor is less than 2, calculated on a molar basis. In one embodiment, the composition of the stream added to the reactor and the amount of the stream added to the reactor is such that the ratio of alkalinity to ammonium in the reactor is less than 2, calculated on a molar basis. In this specification, alkalinity is expressed as the moles of $H^+$ required to lower the reactor pH to 4.2, per the standard definition of alkalinity. Further, the ratio of alkalinity to ammonium is given as a molar ratio unless otherwise indicated.

In one embodiment, the ratio of alkalinity to ammonium in the reactor is less than 1.9, or less than 1.8, or less than 1.7, or less than 1.6, or less than 1.5, or less than 1.4, or less than 1.3, or less than 1.2, or less than 1.1, or less than 1, or less than 0.9, or less than 0.8, or less than 0.7, or less than 0.6, or less than 0.5, calculated on a molar basis. In some embodiments, the ratio of alkalinity to ammonium in the reactor is from 1 to 1.9, or from 1.1 to 1.8, or from 1.2 to 1.7, or from 1.3 to 1.6, or from 1.4 to 1.6, or about 1.5.

In one embodiment, the present invention comprises the steps of feeding a wastewater or sludge to the reactor, the reactor containing ammonium oxidising bacteria (AOB) and nitrite oxidising bacteria (NOB), the AOB oxidising ammonium to reduce pH in the reactor to between 5.5 and 6.0, continuing to operate the reactor at a pH of between 5.5 and 6.0 until a population of acid resistant AOB is selected, and continuing to operate the reactor such that the acid resistant AOB oxidise ammonia and the pH within the reactor is lowered to below 5, preferably between 4 to 5, preferably between 4.5 to 5.

In this embodiment of the present invention, it is not necessary to add additional acid from external sources to the reactor in order to achieve a pH of below 5. Rather, the low pH is generated in-situ. In this embodiment, the reactor is operated in a start-up phase which a population of AOB and NOB is present. The AOB oxidise ammonium, which results in the pH dropping. In conventional operation of such reactors, the pH drops to between 5.5 and 6 and at that pH level both the AOB and NOB become inactivated or inhibited and the reactions stop. Conventional operation of such reactors would see additional alkalinity being added to the reactors to increase the pH, which will then re-start the activity of the AOB and NOB. However, in this embodiment of the present invention, the reactor was allowed to operate for a further period of from 1 day to 100 days, such as from 10 days to 2 months, which resulted in the selection of an acid resistant AOB population in the reactor. The acid resistant AOB selected started oxidising ammonia again, which resulted in the pH of the liquor or solution in the reactor dropping to below 5. At such low pH levels, some of the nitrite that is formed by the AOB is converted to free nitrous acid and the levels of free nitrous acid that are present completely suppress or kill the NOB.

The present invention builds upon the process described in our international patent application number PCT/AU2012/000725, which is based upon, in part, generating free nitrous acid in-situ to suppress NOB and promote AOB. The process described in our earlier international patent application added acid to the sludge to affect generation of free nitrous acid. However, it was discovered that the sludge contained significant levels of alkalinity, typically as Bicarbonate ions ($HCO_3^-$). Accordingly, when acid was added, the $HCO_3^-$ ions had a significant buffering effect. As a result, significant additional acid was required to be added to overcome this buffering effect. Furthermore, the AOB also produce hydrogen ions which would also tend to lower the pH. Again, the presence of significant alkalinity in the sludge resulted in those hydrogen ions being consumed by the alkalinity without causing much change in the pH.

By a further explanation, the ammonium oxidising bacteria oxidise ammonium to nitrite by the following reaction:

$$NH_4^+ + 3/2O_2 \rightarrow NO_2^- + 2H^+ + H_2O \tag{3}$$

Free nitrous acid can then be formed by the reaction of nitrite with hydrogen ions, as set out in reaction (4) below:

$$NO_2^- + H^+ \leftrightarrow HNO_2 \tag{4}$$

However, the presence of excess alkalinity in the reactor results in the following reaction taking place, which consumes hydrogen ions:

$$HCO_3^- + H^+ \rightarrow H_2O + CO_2 \tag{5}$$

Therefore, if the molar ratio of alkalinity to ammonium is greater than 2, all of the hydrogen ions generated by the AOB in reaction (3) above will be consumed by the alkalinity as a result of reaction (5). Consequently, there will be little or no change to the pH in the reactor, which will reduce or minimise the amount of free nitrous acid that is formed. The presence of free nitrous acid in the reactor is advantageous in that it selectively promotes the growth of AOB over NOB. If NOB not suppressed, the nitrite formed by the AOB is further oxidised to nitrate, which is undesirable, particularly if the liquor from the reactor is fed to an anammox reactor.

In embodiments where the stream that is added to the reactor to reduce the ratio of alkalinity to ammonium is a stream that contains ammonium, the amount of hydrogen ions produced by the AOB in accordance with reaction (3) is greater than the ability of the alkalinity present in the reactor to consume those hydrogen ions in accordance with reaction (5). As a result, the concentration of hydrogen ions in the reactor increases, which results in a decrease in the pH which, in turn, results in the in-situ generation of free nitrous acid and the subsequent suppression of NOB.

As a further advantage of embodiments of the process of the present invention, the treated stream removed from the reactor contains nitrite ions and these can be conveniently used as a feed to an anammox reactor.

In embodiments where the stream that is added to the reactor comprises a THP-AD liquor or an AD-liquor, the normally problematic THP-AD liquor or AD-liquor is gainfully used in the process (THP-AD liquor refers to a liquor removed from an anaerobic digester that has been fed with sludge that has been treated by thermal hydrolysis pre-treatment, AD liquor refers to a liquor that has been removed from an anaerobic digester that has been fed with sludge that has not been treated by thermal hydrolysis pre-treatment).

In one embodiment, the wastewater or sludge that is fed to the reactor comprises a primary sludge or activated sludge or a high rate activated sludge (also known as HRAS) or aerobically digested sludge or anaerobically digested sludge.

It is believed that the operating conditions of temperature and pressure in the reactor are not especially critical to the present invention and it is believed that conditions of temperature and pressure that are used in wastewater treatment plants can be used. These conditions are well-known and need not be described further.

The amount of the stream that is fed to the reactor will depend upon the amount of components in the stream that can reduce the alkalinity to ammonium ratio. Accordingly, in some aspects, the present invention further comprises analysing one or both of alkalinity and ammonium in a feed material supplied to the reactor, analysing the stream fed to the reactor to determine the amount of components that reduce the ratio of alkalinity to ammonium in the stream and controlling addition of the stream to achieve the desired alkalinity to ammonium ratio. In one embodiment, the stream that is fed to reactor contains ammonium and the ammonium content of that stream is analysed and the amount of the stream added to the reactor is controlled to obtain the desired alkalinity to ammonium ratio. It will be understood that determine the amount of alkalinity, ammonium and components that reduce the ratio of alkalinity to ammonium may include determining the concentration of those components in the various streams or determining a total amount of those components in the various streams.

In one embodiment, the ratio of the wastewater added to the reactor to the stream added to the reactor is from 20 to 80, or from 30 to 70, or from 60 to 40, or about 50. Ratios outside these ranges may also be used.

In embodiments where the process includes an anammox reactor, the anammox reactor can be operated under conventional conditions that will be well known to persons skilled in the art.

In the process of the present invention, the hydraulic retention time in the reactor and the solid retention time in the reactor may be controlled to promote the growth of AOB. The hydraulic retention time may be greater than 1 hours, or greater than 2 hours, or greater than 3 hours, or greater than 4 hours, or greater than 5 hours, or greater than 10 hours, or greater than 12 hours, or greater than 1 day, or greater than 1.5 days, or greater than 2 days. The hydraulic retention time can vary, depending upon wastewater composition and solids retention time. Hydraulic retention time of about 6 hours has been found to be suitable for use in the wastewater system investigated by the present inventors but, as outlined above, this should not be considered to be limiting.

In one embodiment, the solids retention time is between 1 day and 100 days, or between 10 days and 30 days. Again, the solids retention time can vary from these ranges.

The reactor suitably comprises an aerobic reactor. Any reactor known to be suitable for use in wastewater treatment can be used in this process. In one embodiment, the reactor may be a membrane bioreactor (MBR).

In one embodiment, the stream that reduces the ratio of alkalinity to ammonium comprises an acidic stream (as it is known that acid reacts with alkalinity) or a stream that contains $FeCl_3$. $FeCl_3$ will consume alkalinity when forming precipitates with anions such as hydroxide, thereby removing alkalinity from the liquid phase.

In a second aspect, the present invention provides a method for treating wastewater or sludge comprising the steps of adding the wastewater or sludge to a reactor and mixing the wastewater or sludge with an ammonium-containing liquor or suspension or stream to thereby decrease a ratio of alkalinity to ammonium in the reactor, the reactor containing ammonium oxidising bacteria that oxidise ammonium to produce nitrite and decrease pH, wherein the pH in the reactor is less than 5.5.

In a third aspect, the present invention provides a method for treating wastewater or sludge comprising the steps of adding the wastewater or sludge to a reactor and mixing the wastewater or sludge with a liquor, suspension or sludge from an anaerobic digester or a liquor, suspension or sludge from an anaerobic digester fed with a sludge treated by a thermal hydrolysis pre-treatment to thereby decrease a ratio of alkalinity to ammonium in the reactor, the reactor containing ammonium oxidising bacteria that oxidise ammonium to produce nitrite and decrease pH, wherein the pH in the reactor is less than 5.5.

In a fourth aspect, the present invention provides a method for treating a sludge from an anaerobic sludge digester, the method comprising feeding the sludge from the anaerobic sludge digester to a reactor having a population comprising ammonium oxidising bacteria (AOB) and nitrite oxidising bacteria (NOB), wherein the AOB oxidise ammonium to form nitrite and to lower pH to between 5.5 and 6.5, or to between 5.5 and 6, continuing to operate the reactor for a period of time until an acid resistant AOB population is selected and is formed, whereby the acid resistant AOB population oxidises ammonia to thereby lower the pH in the reactor to less than 5.5 and continuing to operate the reactor at a pH of less than 5.5 and nitrite and free nitrous acid are formed in the reactor, whereby the pH of less than 5.5 is attained by in-situ generation of hydrogen ions/protons without requiring addition of external acid and wherein an external source of nitrite is not used.

The reactor may comprise an aerobic reactor.

In the fourth aspect of the present invention, the low pH and nitrite are generated without requiring external addition of acid and nitrite. This is beneficial in that chemical costs in the process are reduced. Further, control of the process should also be simplified by not having to control the addition of external reactants to the reactor.

In embodiments of the fourth aspect of the present invention, the sludge coming out from an anaerobic sludge digester, with or without liquid being separated from the sludge, can be fed into the reactor, without necessarily needing to be mixed with another wastewater or sludge stream. This stream should typically contain an alkalinity to ammonium ratio that is below 2. Therefore, the reactor can be acidified in-situ, as described above. With accumulation of nitrite, FNA would form, thus suppressing NOB in situ. In this case, the aim is not necessarily to produce a feed for anammox, but mineralizing the sludge thus reducing sludge production. This is because FNA lyse cells and also break down other organics, making them more biodegradable. These more biodegradable matters can then be (partially) converted to $CO_2$, leading to sludge destruction/reduction.

It is also believed that the fourth aspect of the present invention can also be used to treat sludge from an aerobic digester or wastewater. Accordingly, in a fifth aspect, the present invention provides a method for treating a sludge from an aerobic sludge digester or for treating wastewater, the method comprising feeding the sludge from the aerobic sludge digester or the wastewater to a reactor having a population comprising ammonium oxidising bacteria (AOB) and nitrite oxidising bacteria (NOB), wherein the AOB oxidise ammonium to form nitrite and to lower pH to between 5.5 and 6.5, or to between 5.5 and 6, continuing to operate the reactor for a period of time until an acid resistant AOB population is selected and is formed, whereby the acid resistant AOB population oxidises ammonia to thereby lower the pH in the reactor to less than 5.5 and continuing to operate the reactor at a pH of less than 5.5 and nitrite and free nitrous acid are formed in the reactor, whereby the pH of less than 5.5 is attained by in-situ generation of hydrogen ions/protons without requiring addition of external acid and wherein an external source of nitrite is not used.

The reactor may comprise an aerobic reactor.

In a sixth aspect, the present invention provides a method for treating a sludge from an anaerobic sludge digester or for treating wastewater, the method comprising feeding the sludge from the anaerobic sludge digester to a reactor having a population comprising ammonium oxidising bacteria (AOB) and nitrite oxidising bacteria (NOB), wherein the AOB oxidise ammonium to form nitrite and to lower pH to between 5.5 and 6.5, or to between 5.5 and 6, continuing to operate the reactor for a period of time until an acid resistant AOB population is selected and is formed, whereby the acid resistant AOB population oxidises ammonia to thereby lower the pH in the reactor to less than 5.5 and continuing to operate the reactor at a pH of less than 5.5 and nitrite and free nitrous acid are formed in the reactor, whereby the pH of less than 5.5 is attained by in-situ generation of hydrogen ions/protons without requiring addition of external acid and wherein an external source of nitrite is not used.

The reactor may comprise an aerobic reactor.

In a seventh aspect, the present invention provides a method for treating a sludge or for treating wastewater, the method comprising feeding a sludge to a reactor having a population comprising ammonium oxidising bacteria (AOB) and nitrite oxidising bacteria (NOB), wherein the AOB oxidise ammonium to form nitrite and to lower pH to between 5.5 and 6.5, or to between 5.5 and 6, continuing to operate the reactor for a period of time until an acid resistant AOB population is selected and is formed, inoculating the acid resistant AOB population to a second reactor and feeding the sludge or wastewater to the second reactor and operating the second reactor at a pH of less than 5.5 and nitrite and free nitrous acid are formed in the reactor, whereby the pH of less than 5.5 is attained by in-situ generation of hydrogen ions/protons without requiring addition of external acid and wherein an external source of nitrite is not used.

The reactor may comprise an aerobic reactor.

In the above processes, the effluent from the reactor will have most of the alkalinity removed. If it is necessary to reduce metal content in the solids of the effluent, the effluent can be contacted with a source of acid to reduce the pH to below 3 which will leach the metals or metal compounds from the solids into solution. As the alkalinity has largely been removed in the previous processing step, the amount of acid that will be required to reduce the pH to below in 3 will be greatly reduced, thereby improving the economics of the process. The solids and liquids from the acid treatment may be separated from each other. The solids may be used as a fertiliser or disposed of, for example, by spreading it over a field. The liquid may be treated by any conventional means to reduce the dissolved metal content. The equipment and be disposed of. The solids may be washed and/or dried prior to disposal.

Features of embodiments of the second aspect, the third aspect, the fourth aspect and the fifth aspect of the invention may be as described with reference to embodiments of the first aspect of the present invention.

The present inventors have also now managed to successfully operate a reactor used for treating wastewater or sewage or sewage sludge at low pH. According to an eighth aspect, the present invention provides a method for treating sewage or waste water or sewage sludge comprising feeding sewage or waste water or sewage sludge having a ratio of alkalinity to ammonium of less than 2.0, calculated on a molar basis, or less than 1.9, or less than 1.8, or less than 1.7, or less than 1.6, or less than 1.5, or less than 1.4, or less than 1.3, or less than 1.2, or less than 1.1, or less than 1, or less than 0.9, or less than 0.8, or less than 0.7, or less than 0.6, or less than 0.5, calculated on a molar basis, to a reactor containing ammonium oxidizing bacteria (AOB), wherein the AOB oxidise ammonia to reduce or maintain pH below 5.5, or below 5.0, or from 4 to 5, or from 4.5 to 5, or less than or equal to 3, or from 1 to 3, or from 1.5 to 3, or from 2 to 3.

In one embodiment of the eighth aspect of the present invention, the ratio of alkalinity to ammonium in the reactor is less than 2.0, calculated on a molar basis, or less than 1.9, or less than 1.8, or less than 1.7, or less than 1.6, or less than 1.5, or less than 1.4, or less than 1.3, or less than 1.2, or less than 1.1, or less than 1, or less than 0.9, or less than 0.8, or less than 0.7, or less than 0.6, or less than 0.5, calculated on a molar basis.

In embodiments of the eighth aspect of the present invention where the pH is in the range of from 4 to 5.5, the method may be as described with reference to the first to seventh aspects of the present invention.

In some embodiments of the eighth aspect of the present invention, the pH may be less than 3, or from 1 to 3, or from 1.5 to 3, or from 2 to 3. These pH levels can be achieved without having to add external acid to the reactor. These pH levels have not previously been attained.

In a ninth aspect, the present invention provides a method for reducing metals in a sludge comprising the steps of selectively promoting growth of acid resistant ammonium oxidising bacteria by feeding sewage or waste water or sewage sludge or a liquor having a ratio of alkalinity to ammonium of less than 2.0, calculated on a molar basis, or less than 1.9, or less than 1.8, or less than 1.7, or less than 1.6, or less than 1.5, or less than 1.4, or less than 1.3, or less than 1.2, or less than 1.1, or less than 1, or less than 0.9, or less than 0.8, or less than 0.7, or less than 0.6, or less than 0.5, calculated on a molar basis, to a reactor containing ammonium oxidizing bacteria (AOB), until a population of AOB that can generate a pH of less than 3 is obtained and supplying sludge to a reactor containing the population of AOB whereby the pH in the reactor is maintained at less than or equal to 3 and metals in the sludge are at least partly dissolved and at least partly removed from the sludge.

In one embodiment, the sludge is separated from other reactor contents and may be disposed of, such as by disposal over a field or agricultural land.

In one embodiment, the population of acid resistant AOB is obtained by taking a sludge from a waste water treatment plant, such as a sewage sludge or an activated sludge, and adding it to a reactor, feeding a stream of sewage or waste water or sewage sludge or liquor having a ratio of alkalinity to ammonium of less than 2.0, calculated on a molar basis, or less than 1.9, or less than 1.8, or less than 1.7, or less than 1.6, or less than 1.5, or less than 1.4, or less than 1.3, or less than 1.2, or less than 1.1, or less than 1, or less than 0.9, or less than 0.8, or less than 0.7, or less than 0.6, or less than 0.5, to the reactor such that AOBs cause the pH to drop, for example, to around 6, and continuing to operate the reactor until the pH drops to below 3.

In one embodiment, the reactor is operated for 5-15 days, or around 10 days, to cause the pH to drop to around 6, and the reactor is continued to operate for between 40 and 70 days, or between 50 and 60 days and the pH fluctuates between 4-6, and continued operation results in the pH dropping to below 3. This results in a population of acid resistant AOB that can withstand pH of 3 or less being generated. This population of acid resistant AOB may then be used to treat sewage or sludge, either by adding sewage or sludge to the reactor containing the population or by inoculating the population to another reactor.

The eighth and ninth aspects of the present invention may achieve pH of 3 or less without requiring addition of sulphur or sulphur compounds, or without requiring addition of iron or iron compounds. The reactor may comprise an aerobic reactor.

The ninth aspect of the present invention allows for the in-situ generation of sufficient acidity to leach metals from sludge without requiring addition of chemicals. The treated sludge will have a reduced metal content and may be suitable for use as a fertiliser on agricultural land or may be suitable for disposal by spreading over fields.

In one embodiment of the eighth and ninth aspects of the present invention, a sludge is fed to a first reactor operated at a pH of from 4 to 6 and the sludge is then fed to a second reactor operated at a pH of 3 or less. In another embodiment of the seventh and eighth aspects of the present invention, a sludge is fed to a first reactor operated at a pH of 3 or less.

In all aspects of the present invention, the reactor may have a bacterial population that includes *Candidatus Nitrosoglobus*. The *Candidatus Nitrosoglobus* may be naturally present in the reactor or in the feed(s) to the reactor, or the *Candidatus Nitrosoglobus* may be added to the reactor, such as by a deliberate inoculation following growth of *Candidatus Nitrosoglobus* in a laboratory. *Candidatus Nitrosoglobus* is an acid resistant ammonium oxidizing bacteria that will selectively outgrow other AOB and NOB in the reactor.

Any of the features described herein can be combined in any combination with any one or more of the other features described herein within the scope of the invention.

The reference to any prior art in this specification is not, and should not be taken as an acknowledgement or any form of suggestion that the prior art forms part of the common general knowledge.

BRIEF DESCRIPTION OF DRAWINGS

Various embodiments of the invention will be described with reference to the following drawings, in which:

FIG. 6 shows (A) Volatile solids (VS) concentrations in the feed, control reactor, and the experimental reactor; (B) VS destruction efficiency of the experimental reactor and the control reactor;

FIG. 7 shows (A) Fecal coliform levels in the feed sludge, control reactor and the experimental reactor; (B) specific oxygen uptake rate (SOUR) of the feed sludge, sludge in control reactor and in the experimental reactor;

FIGS. 8A and 8B show Nitrogen compounds ($NH_4^+$, $NO_2^-$, $NO_3^-$, total nitrogen) in effluent and pH profiles in the reactor during the first 110-day operation;

FIG. 9 shows metal leaching from anaerobically-digested sludge. (A) N and pH profile during the seven-day batch; (B) solubilization efficiency of metals at the end of the batch;

FIG. 10 shows Physiological characterization of the enrichment. (A) optimum pH measured by oxygen uptake rate (OUR); (B) affinity constants of total ammonia at the optimal pH 5.5; (C) optimal temperature measured at pH 5.5 (\*\*\*means $p<0.001$); (D) incubation growth test for estimating the maximum growth rate at the optimal pH 5.5; and FIG. 11 shows a flowsheet of a process in accordance with the present invention that can reduce metal content in the sludge/effluent form the process.

DESCRIPTION OF EMBODIMENTS

Figure 1:
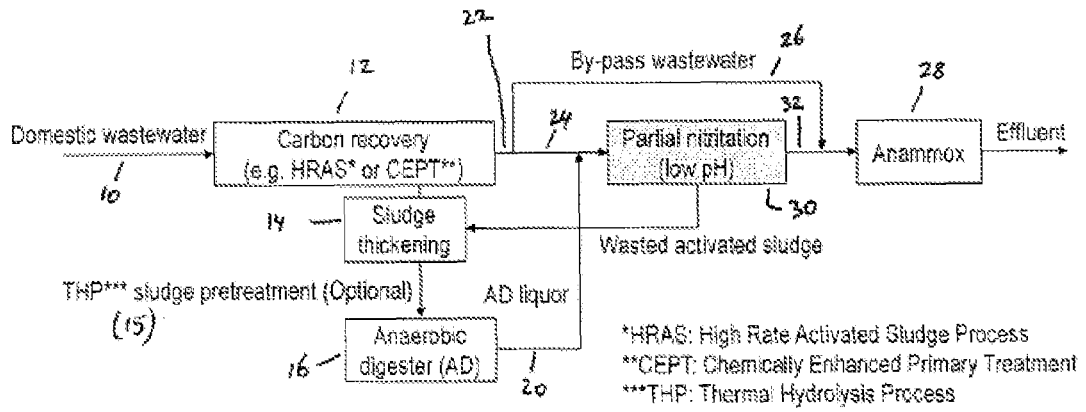
FIG. 1 shows a flow sheet of a method in accordance with one embodiment of the present invention.

In FIG. 1, an influent wastewater 10 is fed to a high rate activated sludge process (HRAS) or a chemically enhanced primary treatment (CEPT) 12. Some of the activated sludge from the high rate activated sludge process 12 is fed to sludge thickener 14. The sludge from sludge thickener 14 may then undergo an optional thermal hydrolysis pre-treatment step 15 and then be sent to an anaerobic digestion step 16. Following anaerobic digestion, the sludge is dewatered to obtain an anaerobic digestion liquor 20.

The remainder of the mainstream wastewater 22 from HRAS or CEPT 12 is split into a first stream 24 and a second stream 26, with the first stream 24 and second stream 26, each comprising approximately half of the remainder of the mainstream wastewater. The second stream 26 contains ammonium and is fed to an anammox process 28. The first stream 24 is fed to an aerobic reactor 30. The AD liquor 20 is also fed to reactor 30. The AD liquor 20 is rich in ammonium yet short of alkalinity and as a result, feeding stream 20 to the reactor 30 results in the ratio of alkalinity to ammonium in reactor 30 decreasing. Ammonium oxidation will therefore be produced in reactor 30 (along with free nitrous acid, which selectively promotes growth of AOBs at the expense of NOBs) Ammonium oxidation will therefore be stopped at nitrite rather than being further oxidized to nitrate in reactor 30. Accordingly, liquor from the reactor 30 can be transferred via stream 32 to the anammox process 28. The streams 26 and 32 that are fed to the anammox process 28 provide the required ammonium and nitrite for the anammox bacteria to proliferate and reduce the bulk of the nitrogen compounds fed to the anammox process 28 to nitrogen gas ($N_2$).

In another embodiment, liquor from an anaerobic digester that is fed with sludge that has not undergone a thermal hydrolysis pre-treatment may be fed to the reactor. In this embodiment, the THP step 16 in FIG. 1 may be omitted or by-passed. In another embodiment, the stream from the anaerobic digester can be sent to the reactor without dewatering.

Figure 2:
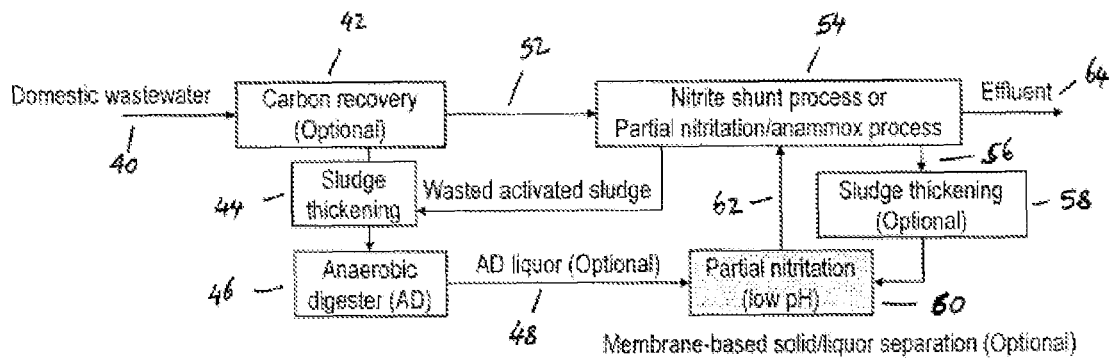
FIG. 2 shows a flowsheet of another embodiment of the present invention.

FIG. 2 shows a flowsheet of another embodiment of the present invention. In FIG. 2, a domestic wastewater 40 is sent to an optional carbon recovery process 42. This carbon recovery process may be HRAS or CEPT. The sludge is sent to sludge thickening at 44 and the thickened sludge is then sent to an anaerobic digester 46. The anaerobic digester sludge or the anaerobic digester liquor 48 is sent to a reactor 60.

The liquor 52 from carbon recovery 42 is sent to a nitrite shunt process or partial nitritation/anammox process 54. The sludge or slurry 56 from process 54 is sent to optional sludge thickening 58 and then fed to reactor 60. Reactor 60 is equivalent to reactor 30 in FIG. 1. The liquor 62 from reactor 60, which contains nitrite and free nitrous acid, is then fed as stream 62 to process 54. Effluent 64 is removed from process 54.

Figure 3:
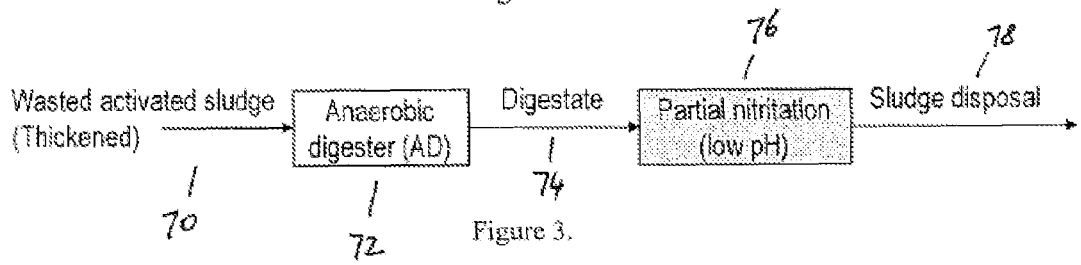
FIG. 3 shows a flowsheet of another embodiment of the present invention.
Figure 4A:
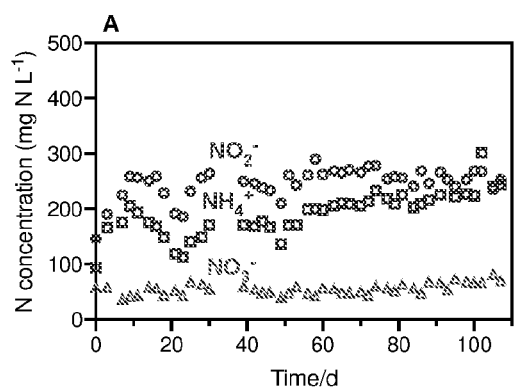
FIG. 4 shows nitrogen profiles (including ammonium, nitrite, and nitrate) of (A) experimental reactor; (B) control reactor.
Figure 4B:
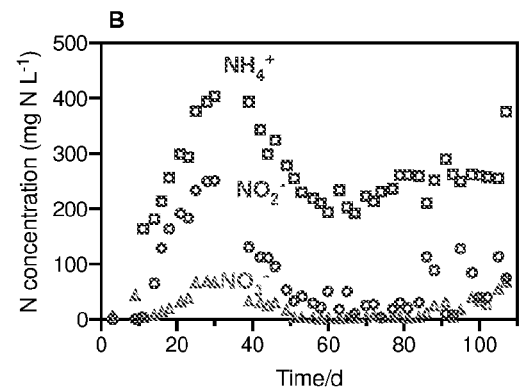

FIG. 3 shows another embodiment of the present invention in which a waste activated sludge 70 is fed to an anaerobic digester 72. The digestate 74 is fed to reactor 76 which is operated in accordance with the present invention, in which the digestate 74 has a low ratio of alkalinity to ammonium. As a result, AOB bacteria that are acid resistant are selected for growth and pH drops to below 5. As a result, the AOB consume the digestate and the amount of sludge that needs to be disposed is reduced. Sludge disposal is shown at 78 in FIG. 3.

In the process shown in FIG. 3, reactor 76 is operated at a pH of from 4.5 to 5 without requiring the addition of any external acid or nitrite to obtain that pH. Although the AOB population in reactor 76 that has been selected in the acidic conditions that form in reactor 76 could continue to oxidise ammonia and cause the pH to be lowered to below 4.5, addition of the digestate 74 maintains the pH in the range of 4.5 to 5. This is advantageous in that free nitrous acid is unstable at pH below 4.5 and this could result in the unwanted formation of nitrate. Reactors 30 and 60 in FIGS. 1 and 2 are also operated in a similar manner.

Example 1

An MBR (membrane bioreactor) was established for the verification of the concept shown in FIG. 1. The MBR had a working volume of 1.8 L. The MBR was fed with the mixture of sidestream THP-AD liquor and mainstream HRAS (high rate activated sludge) effluent in the ratio of 1:50. HRT (hydraulic residence time) was 1.5 d. No wastage was performed and thus SRT (solids residence time) was not calculated. HRAS effluent in mainstream was split into two streams. The alkalinity deficiency in the feed to the MBR was intentionally intensified through mixing THP-AD liquor with the half mainstream fed to the MBR. The reactor was fed with the effluent of a pilot-scale HRAS unit in Luggage point (Brisbane, Australia). THP-AD liquor was collected from the centrate after THP-AD processes in Oxley Creek WRP (Brisbane, Australia). The characteristics of HRAS effluent and THP-AD liquor were listed in Table 1.

TABLE 1

| Parameters | HRAS | THP-AD liquor |
|---|---|---|
| $NH_4^+$—N (mgN/L) | 44.71 ± 4.49 | 2440 ± 123 |
| TCOD (mg COD/L) | 287 ± 51 | 11700 ± 400 |
| SCOD (mg COD/L) | 95 ± 21 | 4500 ± 260 |
| TSS (mg/L) | 180 ± 160 | 8350 ± 1750 |
| TKP (mg P/L) | 8.23 ± 1.31 | 753 ± 47 |
| TKN (mg N/L) | 63.07 ± 12.23 | 2660 ± 160 |

TABLE 1-continued

| Parameters | HRAS | THP-AD liquor |
|---|---|---|
| Alkalinity (mg $CaCO_3$/L) | 334 ± 12 | 4775 ± 124 |
| pH | 7.44-7.89 | 7.6 ± 0.1 |

The ratio of alkalinity to ammonium was 5.36 mg $CaCO_3$/mg N in the mixture feed, lower than the theoretical ratio of 7.14 for nitrification. The MBR was operated at long HRT and SRT. Therefore, pH could decrease to such a low value (4.8-5.2) due to the acidification of ammonium oxidation that NOB were successfully suppressed by the in-situ FNA (0.90-2.23 mgN/L). At steady state (shown in Table 2), NAR (nitrite accumulation ratio) could be stably maintained at more than 0.9. The effluent with nitrite could rejoin the other half HRAS effluent with ammonium for the following ANAMMOX process.

TABLE 2

| Parameters | MBR (50-140 d) |
|---|---|
| Influent ammonium (mgN/L) | 84.83 ± 3.61 |
| Ratio of alkalinity/ammonium in influent (mg $CaCO_3$/mgN) | 5.36 ± 0.29 |
| Effluent ammonium (mgN/L) | 14.06 ± 4.77 |
| Effluent nitrite (mgN/L) | 63.74 ± 5.08 |
| Effluent nitrate (mgN/L) | 4.65 ± 2.27 |
| Nitrite accumulation ratio in effluent ($NO_2^-$/$NO_x$) | 0.93 ± 0.04 |
| Operating pH | 4.8-5.2 |
| In situ AOB activity (mgN/(L h)) | 1.08 ± 0.36 |
| In situ NOB activity (mgN/(L h)) | 0.08 ± 0.03 |

In preferred embodiments of the present invention, the ratio of alkalinity to ammonium in the reactor was decreased by adding THP-AD liquor to the reactor. This resulted in the proliferation of AOBs at the expense of NOBs in the reactor, and the production of nitrite and free nitrous acid. Liquor from this reactor was used as part of a feed to an anammox reactor to achieve mainstream deammonification.

Example 2—Aerobic Digestion of Sludge

In this example, the experimental reactor was inoculated with an acid tolerant and FNA-resistant AOB. The reactor size was 750 $cm^3$. The pH in the reactor during the experimental runs was around 5. This pH was maintained without having to add additional acid. FIGS. 4 to 7 show the results obtained. In this experiment, the control reactor was not inoculated in the same manner as the experimental reactor.

Figure 5A:
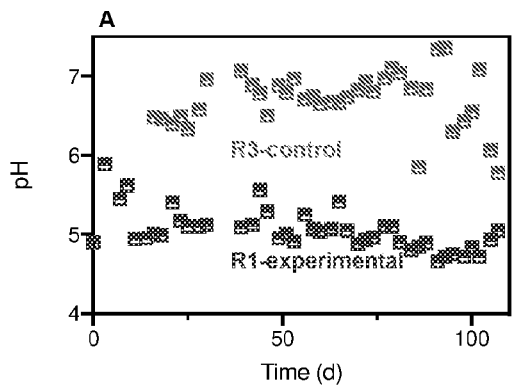
FIG. 5 shows (A) Comparison of pH between the experimental reactor and the control reactor; (B) comparison of in-situ free nitrous acid (FNA) concentration between the experimental reactor and the control reactor.
Figure 5B:
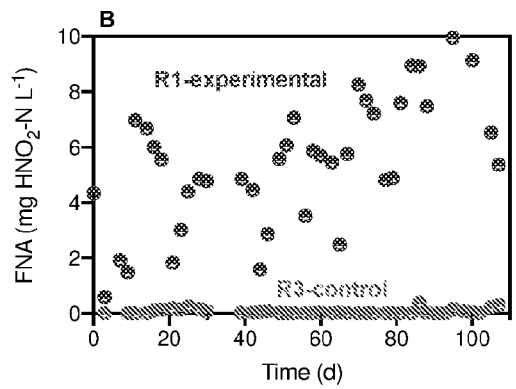

As can be seen from FIGS. 5A and 5B, the pH in the experiment reactor was significantly lower than the pH in the control reactor, with the pH in the experimental reactor averaging around 5. In the experiment reactor, the pH was consistently between 6 and 7. FIGS. 7A and 7B also showed lower faecal coliform readings in the experimental reactor and lower specific oxygen uptake rate in the experiment reactor.

Example 3—Leaching of Metals from Sludge

The centralized collection and treatment of wastewater generates large amounts of sludge, which needs to be safely disposed. Sludge treatment and disposal can incur considerable operational cost, up to 50% the total cost of a wastewater treatment plant (WWTP). The most economical and commonly-used method of sludge disposal is land application. Through applying the sludge to soil as a fertilizer, the N, P, other micronutrients, and organic matter can be released into the soil, hence improving its physical, chemical and biological properties. Despite the economically-effectiveness of land application, it is restricted from wider use due to the presence of heavy metals in the sludge. The heavy metals in sludge, once leached into the soil, can contaminate the underground water and accumulate along the food chain, ultimately causing metabolic disorder and chronic diseases in humans.

Therefore, to facilitate the use of metal-laden sludge on agriculture land, the sludge has to be detoxified prior to its land application, namely solubilizing the metal cations from the solid substrates. Metals in the sludge majorly exist in the form of sulfides, oxides, hydroxides, silicates, insoluble salts or linked with sludge organic matter. Generally, the metals can be solubilized from those insoluble complexes by acidifying the sludge to pH 2.0 to 3.0. This can be achieved through adding inorganic acids ($H_2SO_4$, HCl or $HNO_3$), the so-called chemical leaching. However, chemical leaching incurs additional cost and causes secondary pollution associated with the external chemical dosage. A cost-effective and environmental-friendly alternate is called bioleaching, employing either the direct metabolism or the indirect product of metabolism of functional microorganisms to leach metals from sewage sludge. The two main functional groups, at present, are iron-oxidizing and sulfur-oxidizing microorganisms. Different energy sources, such as $FeSO_4$, $FeS_2$, and $S_0$, need to be supplied for the involved microorganisms to function. Although bioleaching could save 80% chemical dosage compared to chemical leaching, the chemical cost and potential secondary pollution associated with the known methods mentioned above still cannot be neglected. For example, the residue sulfur dosed, if applied to land, may cause soil acidification.

This example is based on the hypothesis that indigenous acid-tolerant ammonia-oxidizers in wastewater treatment plant (WWTP) systems can be enriched and utilized to leach heavy metals from sludge, such as anaerobic digester sludge (ADS). The enrichment was conducted in a sequencing batch reactor (SBR), inoculated with wasted activated sludge from the local full-scale municipal WWTP. To create acidic pH in the reactor by ammonium oxidation, the SBR was fed with alkalinity-inadequate anaerobic digester (AD) centrate/liquor. Upon obtaining ammonia-oxidizing community capable of functioning at pH 2.0-3.0, the feasibility of metal-leaching from ADS using ammonium as the energy source was tested in a seven-day batch test. The dominant ammonia-oxidizers were phylogenetically and physiologically characterized, in order to gain insights into the microorganisms and support the process development.

Enrichment of indigenous acid-tolerant ammonia-oxidizers from WWTP

A two litre reactor was set up and initially inoculated with wasted activated sludge from the local full-scale municipal WWTP (Brisbane, Australia). The feed was collected from centrifuge supernatant of AD effluent in the same WWTP. The concentrations of ammonium and alkalinity in the AD centrate were 881.3±78.9 mg N/L and 32.1±2.3 mmol $CaCO_3$/L, featured by a low alkalinity to ammonium molar ratio of 0.51 mol $CaCO_3$/mol $NH^{4+}$—N.

The reactor was operated in SBR mode. Starting with one litre of liquid, the reactor was fed with 100 mL AD centrate per day. Once hitting two litres, the influent, aeration and mixing would be manually stopped for one hour for the sludge to settle down. One litre of supernatant was then discharged by a peristaltic pump, after which the next 10-day cycle was initiated. Thereby, the hydraulic retention time (HRT) was 20 days, giving rise to an ammonium loading rate at 44 mg N/(L d). Compressed air was supplied by an air pump at 1 L/min through an air diffuser, with a dissolved oxygen concentration higher than 5 mg $O_2$/L (measured by Optical DO sensor (inPro 6960i, METTLER TOLEDO) and Multi-parameter transmitter (M800, METTLER TOLEDO)). pH in the reactor was monitored but not controlled by a pH probe (general purpose pH probe, TPS) and a transmitter (mini CHEM, TPS). The average pH was calculated on a daily basis. The reactor was mixed by a magnetic stirrer at 250 rpm. The reactor was operated in an air-conditioned room with the temperature controlled at 22±1° C. No sludge was wasted during the whole reactor operation except for microbial sampling.

Ammonium, nitrite and nitrate concentrations in the effluent were monitored every 10 days. Microbial samples were taken also every 10 days and stored in a −80° C. freezer before community profiling.

Metal-Leaching from ADS Using Ammonium as the Energy Source

ADS was collected from anaerobic digester in the local full-scale municipal WWTP (Brisbane, Australia). The ADS was characterised with 26.30±0.66 g/L total solids (TS) and 1130±52.44 mg $NH^{4+}$—N/L in the filtered supernatant.

ADS was mixed with the enriched acid-tolerant culture in a volume ratio of 1:9 in a 500 mL Erlenmeyer flask. The mixture was agitated by magnetic stirrer at 250 rpm. Compressed air was constantly provided through an air diffuser, giving rising to a dissolved oxygen concentration above 5 mg/L (Optical DO sensor inPro 6960i, METTLER TOLEDO, Multi-parameter transmitter M800, METTLER TOLEDO). The batch test lasted for seven days, during which samples were taken every 24 h for determining pH (general purpose pH probe, TPS, mini CHEM, TPS), N concentrations, solubilized and total metal concentrations (as detailed in Section 2.6). The solubilization efficiency of each metal was calculated as $$\text{Solubilization efficiency} = C_s/C_T * 100\%$$

Where $C_s$ is the solubilized metal concentration; $C_T$ is the total metal concentration.

Results

Metal-Leaching from ADS Using Ammonium as Energy Source

In order to leach metals from ADS using ammonium as the energy source, the first step is to enrich acid-tolerant ammonia-oxidizers from wastewater treatment systems. The enrichment was performed in a lab-scale SBR. The SBR was inoculated with wasted activated sludge from the local WWTP and fed with alkalinity-inadequate AD supernatant. The average pH was calculated on a daily basis and effluent nitrogenous compounds (including ammonium, nitrite, and nitrate) were analysed regularly, as shown in FIG. 8.

The SBR was gradually acidified by ammonium oxidation with pH profiles presented in FIG. 8B, due to the inadequate alkalinity in the feed. Theoretically, with a $CaCO_3$ alkalinity to ammonium molar ratio of 0.5, the alkalinity in AD supernatant would be exhausted once 50% of the influent ammonium was oxidized, which would give rise to pH drop to ~6.0. Indeed, upon start-up, the pH gradually decreased to about 6.0 in the end of the first 10-day-cycle (FIG. 8-B). The pH stayed around 6.0 for a few days because the commonly dominant ammonium oxidizers in WWTPs are acid-sensitive, which usually cease to oxidize ammonium at pH below 6.0. In the second 10-day cycle, the pH in the reactor broke through 6.0 and fluctuated between 4.0-6.0 for about 50 days, likely resulting from the build-up of acid-tolerant ammonium oxidizers, which are capable of oxidizing ammonium (simultaneously generating protons to acidify the systems) below pH 6.0. The obstacle preventing pH from further decreasing was likely free nitrous acid (FNA) formed by the accumulated nitrite (FIG. 8-A) under the acidic pH, which was also reported to inhibit ammonium oxidation.

The second pH drop happened since day 60 and finally stabilized around 2.5 until the end of the study. The second pH drop coincided with nitrite oxidation to nitrate (FIG. 8-A), which might release the suppression pressure of FNA. Nitrite nearly disappeared from the effluent when the pH hit below 4 while nitrate took over as the final product of nitrification. The oxidation from nitrite to nitrate was speculated to associate with chemical oxidation of nitrite, since no active nitrite-oxidizing bacteria (NOB) activity was detected. During the steady phase, loaded with 50 mg N/(L d), the ammonium oxidation rate was around 30 mg N/(L d). The reactor was kept running for another 500 days. During the extended phase, pH maintained at the 2.0-3.0, indicating the ammonia-oxidizers enriched in this study were capable of long-term growth at such a low pH level. Acid-tolerant ammonia-oxidizing community able to drive ammonium oxidization at pH 2.0-3.0, was successfully enriched from WWTP systems.

Upon obtaining the stable acid-tolerant ammonia-oxidizing community adapted to pH 2.0-3.0, the feasibility of metal-leaching from ADS using ammonium as the energy source was testified via batch tests. ADS was initially inoculated with the enrichment and kept aerated for seven days. The variations of ammonium and pH during the batch tests were presented in FIG. 9A. The solubilization efficiency of metals (including Al, B, Ba, Ca, Co, Cr, Cu, Fe, K, Mg, Mn, Mo, Na, Ni, P, Pb, Zn) at the end of the batch test was calculated and displayed in FIG. 9B.

pH decrease concomitantly proceeded with the ammonium oxidation to nitrate (FIG. 9A). Driven by ammonium oxidation, the pH decreased to below 2.0 after 72 hours and finally reached 1.67 at the end of the batch test. More than 50% of Al, B, Ba, Ca, Co, Cu, K, Mg, Mn, Na, Ni, and Zn were leached into the aqueous phase with the intrinsic ammonium as energy source. In addition, 20.97±0.70% of Cr, 11.47±0.98% of Fe, 5.63±0.23% of Mo, and 25.54±2.18% of Pb were extracted into the aqueous phase. A chemical-free method of bioleaching from ADS was successfully testified using the indigenous acid-tolerant ammonia-oxidizers enriched from WWTP systems.

Phylogenetic analysis based on 16S full-length rRNA suggested the enriched ammonium oxidizer (Clone) is closely clustered with *Candidatus Nitrosoglobus terrae*, a gamma-proteobacterial AOB (γ-AOB) species recently isolated from acidic agriculture soil. The clone also has a relatively deep-branching association with *Nitrosococcus* genus (belongs to γ-AOB as well), forming a monophyletic lineage distinct form beta-proteobacterial AOB (β-AOB) genera including *Nitrosomonas* and *Nitrosospira*.

The enrichment (that is, the enriched microorganism population) could perform ammonium oxidation under a broad range of pH, as shown in FIG. 10A. The maximum ammonium consumption within 5 days was identified at pH 5.5, which was regarded as the optimum pH. Under pH 3.5 to 8.5, the ammonium consumption was greater than 60% of the maximum consumption, indicating a broad pH range for efficient ammonium oxidation. Even under pH 2.5, the ammonium consumption with 5 days is approximately 30% of the maximum value. Ammonium oxidation proceeded between 17-37° C. with an optimum temperature at 30° C. (FIG. 10B).

Kinetics parameters of the enriched ammonium oxidizers were estimated. The half saturation constant of total ammonia ($NH_3+NH^{4+}$) was estimated at 9.59±4.56 mg N/L at the optimal pH 5.5 (FIG. 10C) based on Michaelis-Menten equation. This suggests that the total ammonia concentration should be above 20 mg N/L to avoid substrate limitation. The maximum growth rate under optimal pH (i.e. 5.5) was estimated at 0.42±0.02 $d^{-1}$ based on ammonium oxidation and nitrite production (FIG. 10C).

DISCUSSION

Detoxification of metal-laden sewage sludge is critical to the reuse of sewage sludge as fertilizer in agriculture land. Bioleaching prevails over chemical leaching because of about 80% chemical cost savings. However, the two prevailing bioleaching approaches, i.e. sulfur-based and iron-based processes, still require dosing sulfur and ferrous iron as the energy sources. The dosed chemicals would not only incur extra cost, but also remain in the bioleached sludge and cause soil acidification when applied to agriculture land.

This study, for the first time, proposed ammonium-based bioleaching utilizing the intrinsic ammonium in sewage sludge as the energy source, therefore totally exempting the chemical dosage. In a seven-day batch test aiming for metal-leaching from ADS, the pH was driven down to 1.67 by ammonium oxidation. The ending pH is comparable to sulfur-based process and slightly lower than iron-based process. Concomitantly with the pH decrease, significant metal-leaching was observed in Al, B, Ba, Ca, Co, Cu, K, Mg, Mn, Na, Ni, and Zn, with a solubilization efficiency higher than 50%. However, only 20.97±0.70% of Cr, 11.47±0.98% of Fe, 5.63±0.23% of Mo, and 25.54±2.18% of Pb were extracted into the aqueous phase. The phenomenon had been identified in sulfur-based and iron-based processes as well. A possible explanation is that Cr, Fe, Mo, and Pb have a strong tendency to bound with organic matter, which cannot be readily solubilized in an acidic environment.

The concept of ammonium-based metal-leaching was firstly testified on ADS on account of the ample ammonium source (1 g/L) released during anaerobic digestion. However, it is noted that this concept is not only limited to ADS sludge sources, but is also applicable to other sludge sources, such as primary sludge, secondary sludge, and wasted sludge. For those sludge sources, where most of nitrogen in those sludge sources is organically bounded, a process called "simultaneous sewage sludge digestion with metal bioleaching" (SSDML), which involves the coupling of bioleaching process with sludge digestion process in a single reactor, can be applied. The nitrogen will be released during sludge digestion in the form of ammonium, which can be used as the energy sources for metal-leaching.

The ammonium-based metal leaching process was driven by an acid-tolerant AOB enriched from WWTP systems. It affiliated with Ca. Nitrosoglobus, a novel AOB genus recently isolated from acidic agriculture soil. Physiological characterization indicates the enriched AOB can survive at a broad range of pH from 2.5 to 8.5. Therefore, pre-acidification is not required for ammonium-based leaching process, which is commonly necessary for iron-based processes.

The ammonium affinity and maximum growth rate of the enriched AOB were also characterized in order to facilitate the development of the process for large-scale applications. The apparent affinity of total ammonia ($NH_3+NH^{4+}$) at the optimal pH 5.5 was estimated at 9.59±4.56 mg N/L. However, considering bioleaching usually happens at pH 2.0-3.0, the apparent affinity of total ammonia ($NH_3+NH^{4+}$) was also estimated at pH 2.5. The affinity to total ammonia at pH 2.5 was 67.45±20.30 mg N/L, much higher than that at pH 5.5. This suggests that the ammonium concentration needs to be maintained above 130 mg N/L during ammonium-based metal-leaching process in case of ammonium limitation. The maximum growth rate at pH 5.5 was estimated at 0.42±0.02 $d^{-1}$. At pH 2.0-3.0, the maximum growth rate is one-third of that at pH 5.5 according to OUR verse pH relations (FIG. 10A), presuming the yield is the same at different pH.

FIG. 11 shows a flowsheet of a possible process in accordance with an embodiment of the present invention in which metals can be leached from sludge. The flowsheet shown in FIG. 11 is similar to that shown in FIG. 3, but with two alternative additional steps shown. For convenience, the process steps of FIG. 11 that are in common with the process steps of FIG. 3 are denoted by similar reference numerals and need not be described further. It will be understood that reactor 76 (in FIG. 3 and FIG. 11) is operated at a pH of from 4.5 to 5 without requiring the addition of any external acid or nitrite to obtain that pH. Reactor 76 is an aerobic digester. Solids reduction also occurs in reactor 76.

In the first embodiment shown in FIG. 11, effluent from reactor 76 is sent to further reactor 80. Further reactor 80 is also an aerobic digester. In this reactor, the pH is further reduced to less than 3 through the protons generated by the selectively grown acid resistant AOBs, such as *Ca. Nitrosoglobus*. As a result of the low pH in reactor 80, metals in the sludge are leached into solution. The liquid and solids from reactor 80 may be separated from each other, with the solids comprising solids having reduced metals content that may be suitable for use as a fertiliser or for disposal on fields. The liquid phase may be sent to a metals recovery process to remove metals therefrom, using any technology.

In the second embodiment shown in FIG. 11, effluent from reactor 76 is sent to a vessel 82 when it is mixed with an external source of acid, such as sulphuric acid (although any suitable acid can be used). This reduces the pH to below 3 and causes dissolution of metals from the solids. The majority of the alkalinity in the AD liquor has been consumed in reactor 76. As a result, the amount of external acid that is required to obtain the desired pH level is dramatically reduced, which greatly improves the economics of this alternative embodiment. Again, the solids and liquids from vessel 82 may be separated from each other and the solids disposed of and the liquids treated for metal removal, as described above.

In the present specification and claims (if any), the word 'comprising' and its derivatives including 'comprises' and 'comprise' include each of the stated integers but does not exclude the inclusion of one or more further integers.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art.

The invention claimed is:

1. A method for treating wastewater or sludge, comprising the steps of:
    providing a sludge or wastewater;
    splitting the sludge or wastewater into a first stream and a second stream;
    providing the first stream to a reactor and mixing the first stream with a stream containing ammonium to thereby decrease a ratio of alkalinity to ammonium in the reactor, wherein the reactor contains ammonium oxidising bacteria that oxidise ammonium to produce nitrite and decrease pH; and
    removing a treated stream from the reactor and feeding the treated stream and the second stream to an anammox reactor.

2. A method as claimed in claim 1 wherein the stream that decreases the ratio of alkalinity to ammonium is a stream containing ammonium that comprises a liquor or a suspension or a sludge.

3. A method as claimed in claim 1 wherein the stream that decreases the ratio of alkalinity to ammonium comprises liquor from an anaerobic digestor, or liquor from an anaerobic digester that receives sludge from a thermal hydrolysis pre-treatment, or a suspension from an anaerobic digester, or a suspension from an anaerobic digester that receives sludge from a thermal hydrolysis pre-treatment, or a sludge from an anaerobic digester, or a sludge from an anaerobic digester that receives sludge from a thermal hydrolysis pre-treatment.

4. A method as claimed in claim 1 wherein the reactor is operated such that the pH of solution or liquor in the reactor is less than 5.5, or less than 5.0, or from 4 to 5, or from 4.5 to 5.

5. A method as claimed in claim 1 wherein the step of mixing the first stream with the stream containing ammonium decreases the ratio of alkalinity to ammonium in the reactor to less than 2, calculated on a molar basis, or less than 1.9, or less than 1.8, or less than 1.7, or less than 1.6, or less than 1.5, or less than 1.4, or less than 1.3, or less than 1.2, or less than 1.1, or less than 1, or less than 0.9, or less than 0.8, or less than 0.7, or less than 0.6, or less than 0.5, calculated on a molar basis.

6. A method as claimed in claim 1 comprising the steps of feeding a wastewater or sludge to the reactor, the reactor containing ammonium oxidising bacteria (AOB) and nitrite oxidising bacteria (NOB), the AOB oxidising ammonium to reduce pH in the reactor to between 5.5 and 6.0, continuing to operate the reactor at a pH of between 5.5 and 6.0 until a population of acid resistant AOB is selected, and continuing to operate the reactor such that the acid resistant AOB oxidise ammonia and the pH within the reactor is lowered to below 5, or to between 4 to 5, or to between 4.5 to 5.

7. A method as claimed in claim 1 comprising analysing one or both of alkalinity and ammonium in a feed material supplied to the reactor, analysing the stream fed to the reactor to determine the amount of components that reduce the ratio of alkalinity to ammonium in the stream and controlling addition of the stream to achieve the desired alkalinity to ammonium ratio.

8. A method as claimed in claim 1 wherein hydraulic retention time in the reactor and solid retention time in the reactor are controlled to promote the growth of AOB and the hydraulic retention time is greater than 1 hour, or greater than 2 hours, or greater than 3 hours, or greater than 4 hours, or greater than 5 hours, or greater than 10 hours, or greater than 12 hours, or greater than 1 day, or greater than 1.5 days, or greater than 2 days, or about 6 hours, and the solids retention time is between 1 day and 100 days, or between 10 days and 30 days.

9. A method as claimed in claim 1 wherein the reactor comprises an aerobic reactor.

10. A method as claimed in claim 1 for treating a sludge from an anaerobic sludge digester, the method comprising:
  feeding the sludge from the anaerobic sludge digester to the reactor, wherein the reactor has a population comprising ammonium oxidising bacteria (AOB) and nitrite oxidising bacteria (NOB), wherein the AOB oxidise ammonium to form nitrite and to lower pH to between 5.5 and 6.5, or to between 5.5 and 6;
  continuing to operate the reactor for a period of time until an acid resistant AOB population is selected and is formed, whereby the acid resistant AOB population oxidises ammonia to thereby lower the pH in the reactor to less than 5.5; and
  continuing to operate the reactor at a pH of less than 5.5 such that nitrite and free nitrous acid are formed in the reactor, whereby pH of less than 5.5 is attained in the reactor by in-situ generation of hydrogen ions/protons without requiring addition of external acid and wherein an external source of nitrite is not used.

11. A method as claimed in claim 1, wherein the stream that decreases the ratio of alkalinity to ammonium is a sewage or wastewater or sewage sludge having a ratio of alkalinity to ammonium of less than 2.0, calculated on a molar basis, or less than 1.9, or less than 1.8, or less than 1.7, or less than 1.6, or less than 1.5, or less than 1.4, or less than 1.3, or less than 1.2, or less than 1.1, or less than 1, or less than 0.9, or less than 0.8, or less than 0.7, or less than 0.6, or less than 0.5, calculated on a molar basis, and wherein the stream that decreases the ratio of alkalinity to ammonium is fed to the reactor containing ammonium oxidizing bacteria (AOB), such that the AOB oxidise ammonia to reduce or maintain pH below 5.5, or below 5.0, or from 4 to 5, or from 4.5 to 5, or less than or equal to 3, or from 1 to 3, or from 1.5 to 3, or from 2 to 3 in the reactor.

12. A method as claimed in claim 11 wherein the ratio of alkalinity to ammonium in the reactor is less than 2.0, calculated on a molar basis, or less than 1.9, or less than 1.8, or less than 1.7, or less than 1.6, or less than 1.5, or less than 1.4, or less than 1.3, or less than 1.2, or less than 1.1, or less than 1, or less than 0.9, or less than 0.8, or less than 0.7, or less than 0.6, or less than 0.5, calculated on a molar basis.

13. A method as claimed in claim 1, further comprising the steps of:
  selectively promoting growth of acid resistant ammonium oxidising bacteria in the reactor by feeding the stream that decreases the ratio of alkalinity to ammonium to the reactor,
    wherein the stream that decreases the ratio of alkalinity to ammonium is a sewage or wastewater or sewage sludge or a liquor having a ratio of alkalinity to ammonium of less than 2.0, calculated on a molar basis, or less than 1.9, or less than 1.8, or less than 1.7, or less than 1.6, or less than 1.5, or less than 1.4, or less than 1.3, or less than 1.2, or less than 1.1, or less than 1, or less than 0.9, or less than 0.8, or less than 0.7, or less than 0.6, or less than 0.5, calculated on a molar basis,
  until a population of AOB that can generate a pH of less than 3 is obtained; and
  supplying metal containing sludge to the reactor containing the population of acid resistant AOB, whereby the pH in the reactor is maintained at less than or equal to 3; or
  inoculating the population of acid resistant AOB to a second reactor and supplying metal containing sludge to the second reactor, whereby the pH in the second reactor is maintained at less than or equal to 3;
  such that metals in the sludge are at least partly dissolved in a liquid which is separated from the sludge to thereby at least partly remove the metals from the sludge.

14. A method as claimed in claim 13 wherein the reactor to which the stream that decreases the ratio of alkalinity to ammonium is fed is operated for 5-15 days, or around 10 days, to cause the pH to drop to around 6, and the reactor is continued to operate for between 40 and 70 days, or between 50 and 60 days and the pH fluctuates between 4-6, and continued operation results in the pH dropping to below 3.

15. A method as claimed in claim 14 wherein the acid resistant AOB is inoculated to the second reactor for treating the metal containing sludge.

16. A method as claimed in claim 1 wherein the reactor has a bacterial population that includes *Candidatus Nitrosoglobus*.

* * * * *